US008285218B2

(12) United States Patent
Papakostas et al.

(10) Patent No.: US 8,285,218 B2
(45) Date of Patent: Oct. 9, 2012

(54) METHODS AND APPARATUS TO IDENTIFY WIRELESS CARRIER PERFORMANCE EFFECTS

(75) Inventors: Achilleas Papakostas, Dallas, TX (US); Michael A. Yonker, Dallas, TX (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 516 days.

(21) Appl. No.: 12/550,752

(22) Filed: Aug. 31, 2009

(65) Prior Publication Data

US 2011/0053513 A1    Mar. 3, 2011

(51) Int. Cl.
*H04B 17/00* (2006.01)
*H04J 1/16* (2006.01)

(52) U.S. Cl. ............... 455/67.11; 455/63.1; 709/224; 370/235

(58) Field of Classification Search ............ 455/67.11; 702/182
See application file for complete search history.

(56) References Cited

U.S. PATENT DOCUMENTS

| | | | |
|---|---|---|---|
| 5,255,309 A | 10/1993 | Katz | |
| 6,470,079 B1 | 10/2002 | Benson | |
| 6,754,470 B2 | 6/2004 | Hendrickson et al. | |
| 6,857,024 B1 | 2/2005 | Chen et al. | |
| 6,928,280 B1 | 8/2005 | Xanthos et al. | |
| 6,977,997 B2 | 12/2005 | Shioda et al. | |
| 2002/0116124 A1 | 8/2002 | Garin et al. | |
| 2002/0116460 A1* | 8/2002 | Treister et al. | 709/204 |
| 2002/0147980 A1* | 10/2002 | Satoda | 725/90 |
| 2002/0191762 A1 | 12/2002 | Benson | |
| 2005/0138529 A1* | 6/2005 | Thorell et al. | 714/774 |
| 2006/0120451 A1* | 6/2006 | Hannuksela | 375/240.12 |
| 2006/0217116 A1 | 9/2006 | Cassett et al. | |
| 2007/0140451 A1 | 6/2007 | Altberg et al. | |
| 2007/0160185 A1 | 7/2007 | Taylor et al. | |
| 2008/0313033 A1 | 12/2008 | Guo et al. | |
| 2009/0064248 A1* | 3/2009 | Kwan et al. | 725/109 |
| 2009/0104915 A1* | 4/2009 | Katis et al. | 455/452.2 |

OTHER PUBLICATIONS

Wikipedia, Mean opinion score, internet article, http://en.wikipedia.org/wiki/Mean_opinion_score, retrieved from the internet on Apr. 1, 2009, 3 pages.

* cited by examiner

*Primary Examiner* — Temesgh Ghebretinsae
*Assistant Examiner* — Gennadiy Tsvey
(74) *Attorney, Agent, or Firm* — Hanley, Flight & Zimmerman, LLC

(57) ABSTRACT

Example methods and apparatus to identify wireless carrier performance effects are disclosed. A disclosed example method includes receiving an indication of media content presentation on a wireless communication device, monitoring a wireless carrier operating parameter in response to receiving the indication of media content presentation, and monitoring the wireless communication device for a media content presentation command. The example method also includes associating the media content presentation command and the wireless carrier operating parameter with a scoring factor indicative of subscriber preferences, and generating a report including the scoring factor.

15 Claims, 10 Drawing Sheets

| HEURISTICS MATRIX ||||
|---|---|---|---|
| MEDIA ACTION | CARRIER PARAMATERS | SCORING FACTOR ||
| SUBSCRIBER ENDED COMMAND | * LOAD TIME > 5% | -0.05 ||
| | 5%< LOAD TIME < 10% | -0.10 ||
| | * PARAM. VALUE 5% UNDER THRESHOLD | -0.21 ||
| | * PARAM. VALUE 10% UNDER THRESHOLD | -0.39 ||
| | * PARAM. VALUE MEETS/EXCEEDS THRESHOLD | 1.00 ||
| SUBSCRIBER INTERRUPTS WITH RELOAD REQUEST | * LOAD TIME > 5% | -0.10 ||
| | 5%< LOAD TIME < 10% | -0.15 ||
| | * PARAM. VALUE 5% UNDER THRESHOLD | -0.34 ||
| | * PARAM. VALUE 10% UNDER THRESHOLD | -0.44 ||
| | * PARAM. VALUE MEETS/EXCEEDS THRESHOLD | 1.00 ||
| MEDIA ENDS WITHOUT SUBSCRIBER COMMAND/ REQUEST | * LOAD TIME > 5% | -0.07 ||
| | 5%< LOAD TIME < 10% | -0.12 ||
| | * PARAM. VALUE 5% UNDER THRESHOLD | -0.15 ||
| | * PARAM. VALUE 10% UNDER THRESHOLD | -0.29 ||
| | * PARAM. VALUE MEETS/EXCEEDS THRESHOLD | 1.00 ||

FIG. 2

| CONTENT SESSION INFORMATION <WIRELESS DEVICE IDENTIFIER> | | |
|---|---|---|
| START TIME (UTC) | | |
| END TIME (UTC) | | |
| SERVICE PROVIDER | | |
| DELIVERY TYPE | | |
| CONTENT TYPE | | |
| MEDIA TITLE | | |
| MEDIA DURATION | | |
| IP TIME OFFSET | | |
| TOWER / BASE STA. ID | | |
| LOCATION INFORMATION | | |
| FRAME RATE | | |
| VIDEO RESOLUTION | | |
| AUDIO QUALITY | | |
| BUFFER TIME | | |
| BASE STA. PWR @ START | | |
| BASE STA. PWR @ END | | |
| AVE. BASE STA. PWR | | |
| SUBSCRIBER ACTIONS | | |

FIG. 4

METHODS AND APPARATUS TO IDENTIFY WIRELESS CARRIER PERFORMANCE EFFECTS

FIELD OF THE DISCLOSURE

This disclosure relates generally to audience measurement and, more particularly, to methods and apparatus to identify wireless carrier performance effects.

BACKGROUND

Media presentation consumption by target audience members generally includes listening to audio information and/or viewing video information. Media presentations may include, for example, radio programs, music, television programs, movies, still images, web pages, advertisements, video games, mobile applications (e.g., iPhone® application(s), social networking applications, browser applications), e-mail messages, text messages etc. Companies and/or organizations that provide one or more media presentations, such as advertisers, broadcast networks, etc., are often interested in the viewing and/or listening experience for a target audience.

While one or more media presentation(s) may originate from an advertiser, a broadcast network, and/or any other company/organization having media-centric interests, such media presentation(s) may pass through a wireless service provider and/or wireless carrier prior to being displayed to a target audience. Target audience members may include subscribers of the wireless service provider that own and/or otherwise possess a wireless communication device, such as a personal digital assistant (PDA) and/or wireless telephone.

BRIEF DESCRIPTION OF THE DRAWINGS

FIG. 2 is an example heuristics matrix that may be used with the example system of FIG. 1.

FIG. 4 is an example content session information data structure that may be used to store content session information associated with a subscriber's wireless communication device.

DETAILED DESCRIPTION

Figure 1:
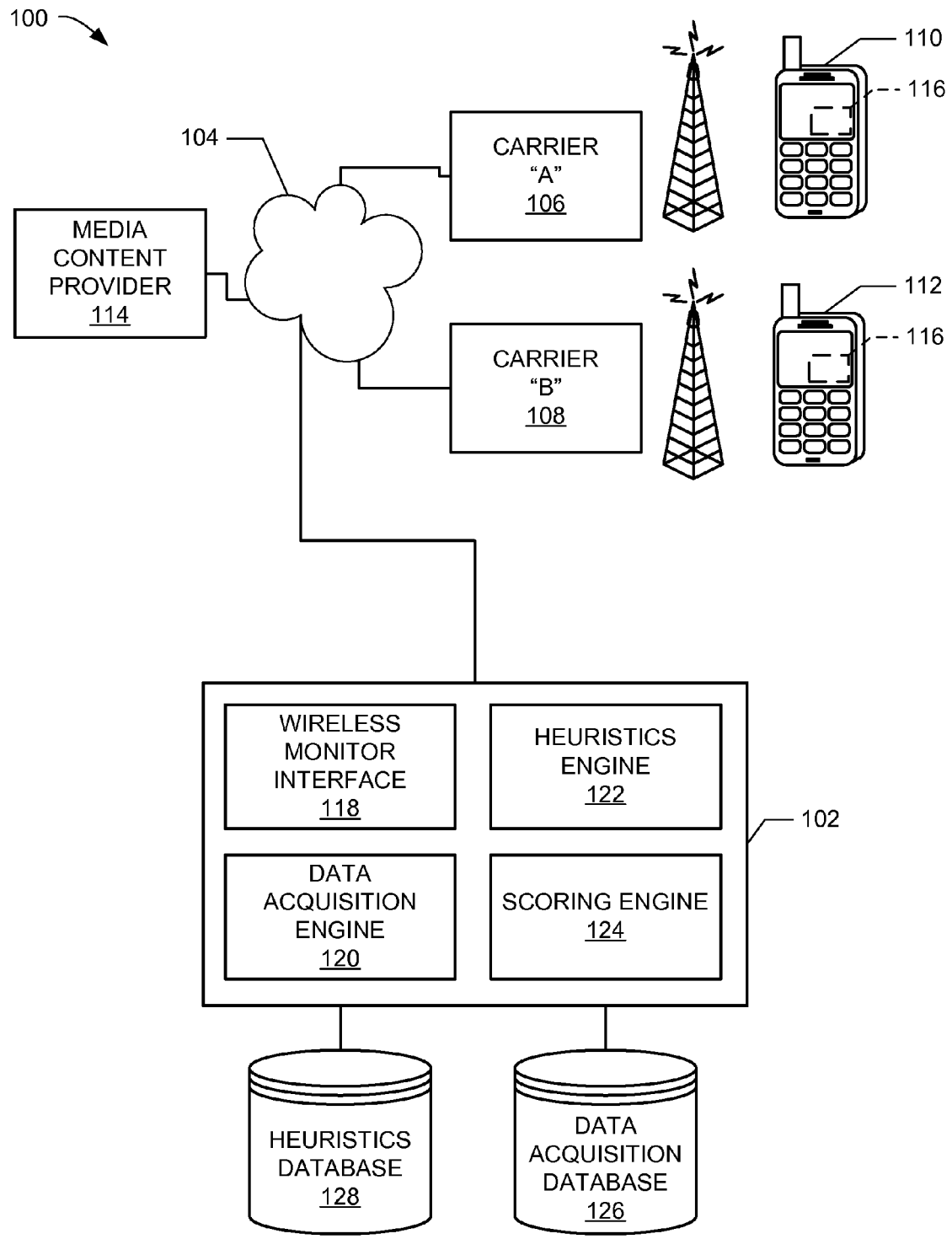
FIG. 1 is a block diagram of an example system to identify wireless carrier performance effects.

The example methods and apparatus described herein may be used to identify wireless carrier performance effects. Example methods and apparatus to identify wireless carrier performance effects are disclosed. A disclosed example method includes receiving an indication of media content presentation on a wireless communication device, monitoring a wireless carrier operating parameter in response to receiving the indication of media content presentation, and monitoring the wireless communication device for a media content presentation command. The example method also includes associating the media content presentation command and the wireless carrier operating parameter with a scoring factor indicative of subscriber preferences, and generating a report including the scoring factor.

A disclosed example apparatus includes a wireless monitor interface to receive an indication of a media content control command from a wireless communication device, and a data acquisition engine to acquire operating parameters associated with an instance of media content presentation. The example apparatus also includes a heuristics engine to identify a heuristic set of the media content control command and the operating parameters, and a scoring engine to associate the identified heuristic set with a scoring factor.

Media-centric companies and/or organizations (hereinafter media content providers) invest significant resources when preparing media content for a target audience. Resources invested by the media content providers include, for example, marketing efforts to develop media content that attempts to captivate the target audience, production efforts to construct media content that is visually and/or audibly pleasing to the target audience, and/or fees provided to one or more wireless carriers (e.g., a wireless service provider) and/or broadcast network(s) associated with the privilege to present such media content to the target audience. In view of one or more of the aforementioned resources invested in the media content, the media content providers have a heightened interest in knowing that the media content is provided to the one or more target audience members with a threshold degree of quality.

Wireless carriers (referred to herein as wireless carriers or wireless service providers) operate as an intermediary content infrastructure between the media content providers having and/or providing media content (e.g., a movie, an advertisement, a web page, etc.), and one or more subscribers of the wireless carrier that comprise target audience members that the media content provider would like to reach with the media content. Media content provided by the media content provider may be provided via an intranet and/or the Internet, which the subscribers may access via the one or more resources accessible and/or provided by the wireless carrier (e.g., wireless cell-towers, relay stations, etc.). Upon reaching an intranet and/or the Internet via the wireless carrier resources, each subscriber may consume and/or otherwise experience media content provided by one or more media content providers.

Wireless carrier resources typically include one or more transceiver towers having wireless telecommunication base stations connected to one or more wireless communication devices, such as cellular telephones, pagers, PDAs, handheld wireless computers, wireless gaming devices, and/or any other wireless communication device that may be used to receive media content from the media content providers. The one or more transceiver towers communicate with wireless communication devices to exchange information (e.g., voice information, data, video, control information, etc.) with a telecommunications system. Such transceiver towers are typically located in cell areas and sites within a geographic area and configured to work in connection with any wireless telecommunication standard including, but not limited to Advanced Mobile Phone Systems (AMPS), Code Division Multiple Access (CDMA) systems, Time Division Multiple Access (TDMA) systems, Global System for Mobile communications (GSM) systems, Enhanced Data rates for Global Evolution (EDGE) systems, General Packet Radio Service (GPRS) systems, Personal Digital Communications (PDC) systems, Personal Communication Services (PCS) systems, Universal Mobile Telecommunications Systems (UMTS), Long Term Evolution (LTE) systems, Time Division Synchronous Code Division Multiple Access (TD-SCDMA) and/or Personal Handy-phone Systems (PHS). Additionally or alternatively, wireless communication devices may employ any other radio-based communication protocol including, but not limited to a Bluetooth based communication protocol, a communication protocol that conforms to any of the Institute of Electrical and Electronics Engineers (IEEE) standards 802.11x, 802.11b, 802.11g, 802.11x (WiFi®) and/or any other suitable short-range wireless communication protocol.

The media content provided by the media content providers may include, but is not limited to video content (e.g., television programming, movies, advertisements, animations, MPEG-2, MPEG-4, Windows Media Video ("WMV"), QuickTime® Movie, Real Video, etc.), flash video (e.g., video for Adobe® flash player (F4V), protected video for Adobe® flash player (F4P), etc.), audio content (e.g., radio programming, Internet radio, satellite radio, MPEG layer-3, Windows Media Audio ("WMA"), Real Audio, audio for Adobe® flash player (F4A), audio book for Adobe® flash player (F4B), etc.), video game content, application content, graphics content (e.g., electronic art, photos, pictures, etc.), Internet information (e.g., web pages, rich site summary ("RSS"), text notifications, etc.), interactive media content, e-mail content, text message content, multimedia content and/or any other content that may be delivered by the media content provider 114. The media content may include, for example, entertainment content, educational content, news, advertising, demographics-based targeted advertising, geographic-based targeted advertising, interest-based targeted advertising, etc. The media content provider may deliver the media content and/or make such media content available via the Internet in compressed and/or uncompressed formats and in encrypted and/or unencrypted formats.

Subscribers to the wireless carrier select and/or otherwise receive media content via their wireless communication device. As described above, the subscribers may have access to the media content by way of systems, facilities and/or infrastructure provided by the wireless carrier. As a result, the quality of such transmitted media content may be affected by one or more capabilities/limitations of such systems, facilities and/or infrastructure. The media content may be provided to the subscribers via a broadcast communication, which delivers the same data (e.g., the same video advertisement/program) to all of the wireless communication devices that are within range (e.g., within range of a transceiver tower) to receive communication signals from the cell tower and/or plurality of cell towers used by the wireless carrier to transmit the broadcast communication provided by the media content provider. On the other hand, the media content may be provided to one or more subscribers via a multicast communication, in which the media content is delivered to selected ones of the subscribers (e.g., in response to a subscriber's selection to receive content). A subscriber's selection for the multicast communication may occur in connection with, for example, pay-per-view selections, subscription-based selections, etc. The wireless carrier may employ one or more back channel links (e.g., a return channel, a reverse channel, a return path, etc.) with the wireless devices and/or the media content providers. Such back channel links may be used to exchange information between the subscriber (e.g., the subscriber's wireless device) related to selections and/or commands (e.g., start, stop, pause, skip, fast forward, rewind, cancel, search, etc.).

The methods and apparatus described herein facilitate, in part, monitoring of commands in connection with one or more performance parameters of the wireless device and/or carrier network during a subscriber's interaction (e.g., receipt) with the media content. For example, although the media content provider may provide, transmit and/or otherwise make available media content having a particular quality (e.g., a particular resolution, a particular display rate in frames-per-second (fps)), such media content may arrive at the subscriber's wireless device at a diminished, degraded and/or attenuated quality. Such quality limitation may occur, for example, due to one or more infrastructure limitations of the wireless carrier, such as channel crowding, bandwidth limitations and/or time-of-day demand-based limitations. Quality limitations of the wireless carrier may differ between carriers and cause undesired video, audio and/or data interruptions. Undesired effects of wireless carrier infrastructure limitations may manifest as choppy video playback, decreased display frame rates, reduced video resolution playback quality, increased buffering delays, audio/video synchronization issues, jitter, signal strength limitation(s) and/or reduced audio quality (e.g., reduced bit rate). One consequence of the inability of a wireless carrier to deliver media content in accordance with one or more quality parameter values, levels, etc. is that the value to the media content provider for delivering the content decreases. In other words, the media content provider may have paid a monetary value to have media content displayed and/or otherwise made available at an agreed-upon degree of quality (e.g., a predetermined video resolution quality, a predetermined frame rate, a threshold buffer delay duration, a predetermined audio bit rate, etc.) to the subscribers of the wireless carrier. Substandard quality has, at least, the potential of creating negative subscriber impressions of the product and/or service associated with the media content. A loss of profits and/or sales opportunities may result when the subscriber becomes frustrated with substandard content delivery.

FIG. 1 is a block diagram illustrating an example system 100 to identify wireless carrier performance effects. The system 100 of FIG. 1 includes a carrier measurement entity 102 configured to analyze one or more quality parameters of wireless carriers and resulting subscriber actions based on such quality parameters. The example carrier measurement entity 102 is communicatively coupled to an intranet and/or the Internet 104, which is further communicatively coupled to one or more wireless carriers, such as example wireless carrier "A" 106 and example wireless carrier "B" 108, each having any number of wireless transceiver towers. Although two example wireless carriers are shown (wireless carriers "A" 106 and "B" 108), any number of wireless carriers may be monitored by the example carrier measurement entity 102. The example wireless carriers "A" 106 and "B" 108 are further communicatively coupled to wireless communication devices 110 and 112, respectively. The wireless communication devices 110 and 112 may be, for example, cellular telephones, pagers, any cellular communication device (e.g., handheld cellular communication devices, cellular adapters for personal computers, etc.), PDAs, handheld wireless computers, wireless gaming devices, and/or any other wireless communication device that may be used to receive media content from a media content provider 114. The example media content provider 114 is also communicatively connected to the wireless communication devices 110 and 112 by way of an intranet/Internet 104 and the respective wireless carrier "A" 106 or the wireless carrier "B" 108.

Each of the example wireless communication devices 110 and 112 includes an example wireless monitor 116 that is configured to, in part, meter wireless activity of the respective subscriber. As described in further detail below, the example wireless monitor 116 monitors and acquires information (e.g., values) associated with one or more carrier performance parameters of the corresponding wireless carrier 106, 108. Wireless carrier performance parameters may include, but are not limited to a frame rate of displayed media content (e.g., in fps), a video quality of displayed media content (e.g., a resolution), an audio quality of displayed media content (e.g., a bit rate in bps), a buffering delay time period of the displayed media content (e.g., in seconds), a channel crowding value, a bandwidth and/or a power level between the wireless communication device 110 and 112 and a respective transceiver tower. The example wireless monitor 116 also monitors subscriber activity during and/or after media content is displayed on or, more generally, rendered/presented by the respective device 110 and 112 and/or an attempt to be displayed on or rendered by the respective device 110 and 112. For example, the example wireless monitor 116 monitors and acquires subscriber selection events (e.g., subscriber selections to view media content), subscriber fast-forward events, rewind events, cancel events (e.g., a subscriber request to discontinue web-page loading), web address entry events (e.g., a subscriber request to navigate to a web-page), and/or reload events (e.g., a subscriber request to reload a web-page). Reload events may occur when, for example, the subscriber becomes frustrated with relatively long wait times for the media content (e.g., a web-page, a video clip, an audio clip, etc.) to be displayed.

In the illustrated example of FIG. 1, the carrier measurement entity 102 includes a wireless monitor interface 118, a data acquisition engine 120, a heuristics engine 122, and a scoring engine 124. The example wireless monitor interface 118 maintains scheduled, periodic, aperiodic and/or manual connectivity with the example wireless monitor 116 modules within each wireless communication device, such as the example wireless communication devices 110 and 112 associated with the carrier "A" 106 and the carrier "B" 108, respectively. Data acquired by the example wireless monitor interface 118 may be stored in tabular format to a data acquisition database 126, as described in further detail below in connection with FIG. 2. While the example wireless monitor 116 performs one or more network parameter measurements and transmits such resulting parameter values to the wireless monitor interface 118 for storage in the data acquisition database 126, the example data acquisition engine 120 may perform additional data acquisition tasks via one or more test and measurement instruments located in one or more geographic locations of a carrier network/infrastructure. For example, one or more base stations associated with the carrier "A" 106 and/or the carrier "B" 108 may include a base station tester, such as the Agilent® E7495A/B Base Station Test Set to facilitate channel power measurements, adjacent channel power measurements, bandwidth for adjacent power channels, etc. Collection of such power measurements may be accomplished via, for example, networked connectivity between the example data acquisition engine 120 and one or more data acquisition devices within the carrier infrastructure, such as within a base station of the carrier "A" 106. Time-stamped channel power measurements may further correlate to one or more events measured by the example wireless monitor 116 in an effort to correlate carrier performance capabilities and corresponding media content quality metrics (e.g., observation of decreased frame rate parameter values when channel powers are relatively low).

The example heuristics engine 122 identifies one or more causes for subscriber behavior based on, in part, media content target quality, media content quality as delivered (e.g., displayed/rendered/presented video and/or audio, etc.) to the subscriber, and/or subscriber behavior during and/or after the media content was presented and/or attempted presentation. Advertisers, media-broadcasters and/or other users of the example system 100 may develop one or more heuristics matrices that identify one or more reasons for subscriber behavior during and/or after media content is presented. Such heuristics matrices may be stored in an example heuristics database 128. FIG. 2 is an example heuristics matrix 200 that includes a media action column 202, a carrier parameters column 204 and a scoring factor column 206. In operation, the example heuristics engine 122 of FIG. 1 identifies a matching action in the media action column 202 that occurred during presentation during and/or after media content was displayed to one or more subscribers. Media actions may include, but are not limited to actions initiated by the subscriber (e.g., play, pause, cancel, fast-forward, rewind, etc.), interruptions due to incoming calls and/or text messages, and/or actions caused by the carrier network/infrastructure (e.g., dropped media content due to channel crowding, bandwidth limitations, etc.).

For example, a subscriber interrupting media content playback prior to completion of the media content 208 may not, by itself, identify why the subscriber chose to stop the media content. However, the example heuristics engine 122 also identifies corresponding carrier parameters 204 that occurred at or around the time at which the media content playback was ended by the subscriber. In the event that a load time (e.g., buffering time) of the corresponding media content was between 5% and 10% above an average and/or expected load time 210 (e.g., a duration of time for which the wireless communication device buffers content over the carrier network), then the example heuristics engine 122 associates the event with a corresponding scoring factor 206 indicative of carrier fault and/or subscriber frustration. In the aforementioned example case, a load time between 5% and 10% of a threshold value corresponds to an example scoring factor of −0.10 (212). As described in further detail below, each instance of media content requested by and/or presented to one or more subscribers is associated with a score based on, in part, one or more quality of service (QoS) parameters and corresponding subscriber behavior during the playback and/or attempted playback of the media content (e.g., video content, audio content, web-page retrieval, etc.).

The methods and apparatus described herein may be used to identify reasons why subscribers may interrupt media content prior to complete playback, aggregate the scored instances of media content exposure to the subscribers to generate one or more generalized scores on a per-carrier basis, and allow advertisers, broadcast entities and/or subscribers to identify which carriers demonstrate a relatively better ability to provide wireless media services. Additionally, such aggregated metrics may be calculated to identify subscriber preferences related to performance parameters, which may include ranking one or more wireless carriers, and/or identifying a corresponding value and/or lease rate for using the infrastructure of the carriers to disseminate media content from the media content providers to one or more subscribers. In other words, those wireless carriers having a superior ability to provide media content to satisfy a desired quality parameter value or degree relative to a threshold representing a minimum level of acceptable quality may better justify a higher advertising rate/fee as compared to those wireless carriers that fail to meet the one or more threshold quality parameter values established by the media content provider (e.g., a threshold video resolution, a threshold rate in fps, a threshold audio quality, a threshold maximum buffering/load-time value, etc.).

In the illustrated example of FIG. 2, in the event that a subscriber interrupts media content prior to completion of presentation of such media by attempting to reload such media content 214 (e.g., a web-browser reload button press), then the example heuristics engine 122 also identifies corresponding carrier parameters 204 during the reload attempt(s). Subscriber actions of reload during, for example, particularly long load times 216 may be indicative of a heightened level of subscriber frustration and/or a heightened subscriber desire to retrieve the media content. Accordingly, the example heuristics engine 122 associates such events with a negative scoring factor having a greater magnitude 218 (e.g., −0.15) as compared to instances when the subscriber does not make one or more refresh attempts for the same media content. On the other hand, if the subscriber is making one or more requests to reload the media content 214 and the carrier metrics 204 indicate that all carrier parameters meet and/or exceed threshold levels 220, then the example heuristics engine 122 associates the event with a neutral and/or positive scoring factor 222. Such example scenarios may occur when the poor quality and/or relatively excessive load times are not the fault of the wireless carrier, but instead may be due to media content provider network problems and/or intranet/Internet congestion. Additionally, in some circumstances the subscriber does not interrupt and/or cause the media content to stop by way of an express command (e.g., a stop command, a skip command, etc.). As such, the corresponding media action column 202 scenario is identified by the heuristics engine 122 as a situation in which media is interrupted and/or ends without subscriber request, and includes corresponding scoring factors 206 based on corresponding carrier parameters 204 that exist at that time.

The one or more media actions of the example media action column 202, carrier metrics of the carrier metric column 204, and the one or more scoring factors of the scoring factor column 206 may be arranged and/or stored as the example heuristics matrix 200 in the example heuristics database 128. One or more users of the methods and apparatus described herein may create, delete and/or edit one or more entries/aspects of the example heuristics matrix 200 based on, for example, industry experience, observed trends, intuitive judgments, educated guesses, and/or any other problem solving strategic causes and effects. The example data acquisition database 126 and/or the example heuristics database may be queried by any application programming interface (API), such as a structured query language (SQL) API. Additionally, the example data acquisition database 126 and/or the example heuristics database may be implemented as mainframe databases (e.g., IBM® DB2, IBM® Virtual Storage Access Method (VSAM), IBM® Indexed Sequential Access Method (ISAM), Adabas D by Software AG®, etc.), client-server databases (e.g., Oracle®, Informix®, SQL Server®, etc.), and/or PC databases (e.g., Microsoft® Access®).

Returning to FIG. 1, the example scoring engine 124 applies the one or more scoring factors associated with each instance of media exposure to generate a normalized score for each wireless carrier. As described in further detail below, the example scoring engine 124 may rank each wireless carrier based on an overall ability to satisfy or exceed one or more quality thresholds, and/or rank each wireless carrier based on its ability to meet or exceed a particular parameter quality level (e.g., a particular bandwidth parameter, a particular frame-rate parameter, a particular audio bit rate parameter, etc.).

Figure 3:
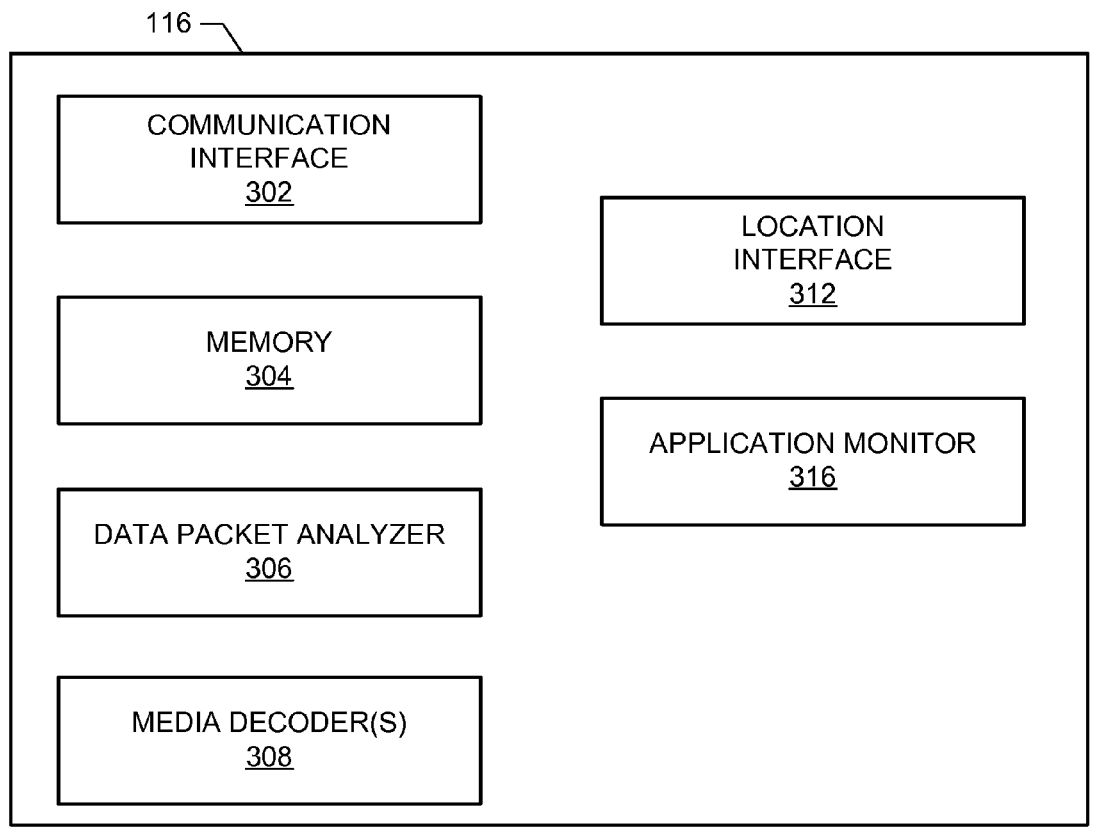
FIG. 3 is a block diagram of an example wireless communicator as shown in FIG. 1.

FIG. 3 is a detailed schematic illustration of the example wireless monitor 116 shown in FIG. 1. The example wireless monitor 116 includes a communication interface 302, a memory 304, a data packet analyzer 306, a media decoder 308, a location interface 312, and an application monitor 316. In operation, the example communication interface 302 receives media content from the carrier (e.g., the carrier "A" 106, the carrier "B" 108, etc.) and/or process voice/data communications via the carrier (e.g., send/receive telephone calls, text messages, etc.). The example communication interface 302 may be implemented using one or more wireless communication protocols including, for example, FLO®, DVB-H, TDMA, GSM®, CDMA, LTE, UMTS, TD-SCDMA, WiFi® and/or any other multicast, unicast, LAN, WLAN and/or broadcast media delivery protocols or voice/data communication protocols.

To store media content and/or other information associated with the wireless communication devices 110 and 112 (e.g., received text messages, contact telephone numbers, application files, etc.), the example wireless monitor 116 includes the memory 304. To analyze data packets used to deliver media content, the example wireless monitor 116 includes the data packet analyzer 306 that is configured to, in part, extract metering information (e.g., program identification information, channel identification information, content provider identification information, base station identifier information, etc.) and/or other information used to generate metering information from data packets used by the media content provider 114 and/or carrier (e.g., the carrier "A" 106, the carrier "B" 108, etc.) to communicate media content.

To decode and/or otherwise identify the media content received from the media content provider 114, the example wireless monitor 116 includes the one or more media decoder(s) 308. The media decoders 308 may include one or more video decoders, one or more audio decoders, one or more graphics decoders, one or more video game engines, one or more Internet data decoders (e.g., html decoders, Java® decoders, etc.), etc. Alternatively, media content identification may occur via analysis of media header information (e.g., metadata indicative of author, title, publisher, etc.). In some examples, the data packet analyzer 306 may be employed to identify media information via the header information and/or the header information may be analyzed by the example data acquisition engine 120 and/or the carrier measurement entity 102.

To determine a location of the example wireless communication device 110 and 112, the example wireless monitor 116 includes the location interface 312 configured to, for example, detect and/or determine the locations to which the example wireless communication devices 110 and 112 are moved. The location interface 312 may be implemented using any location detection/determination technology including, but not limited to, a GPS receiver, a dead reckoning system, an electronic compass, technology to determine location based on triangulation techniques, sensors to detect location codes or identification codes indicative of a location, etc. The example wireless monitor 116 is also provided with the application monitor 316 to detect when media presentation software of the wireless communication devices 110 and 112 has been instantiated and/or when media content is being presented to the subscriber(s). In operation, the example application monitor 316 may detect different operations/events associated with the media presentation software, such as play, pause, skip, rewind, fast forward, etc. Such events are stored in the example memory 304 with corresponding time/date indicators for later analysis.

In operation, the example wireless monitor 116 acquires session information and saves such information in the memory 304. Additionally or alternatively, the session information may be forwarded to the example carrier measurement entity 102 to build one or more content session information charts, such as an example content session information data structure 400 of FIG. 4. Information to populate the example content session information data structure 400 may be obtained from data embedded by the media content provider 114 and/or information embedded in one or more header fields of transmitted carrier network data packets.

As shown in the illustrated example of FIG. 4, the data structure 400 includes measured content session start time information 402 and measured content session end time information 404 to indicate when the wireless communication device(s) 110 and 112 start and stop presenting particular media content. The example data structure 400 also includes service provider information 406 to indicate the identification (e.g., name, identification code, etc.) of the media content provider 114 (FIG. 1). Delivery type information 408 may also be used to indicate the communication protocols and/or transmission mediums used by the wireless carrier(s) 106 and 108 to deliver the media content from the provider 114 to the communication device(s) 110 and 112. In an example implementation, options for the delivery type information 408 may include over-the-air ("OTA") terrestrial delivery (e.g., FLO, DVB-H, etc.), OTA satellite delivery, Internet protocol ("IP") multicast, broadcast, unicast, general packet radio service ("GPRS"), evolution data only ("EVDO"), etc. Content type information 410 is used to indicate the type of media delivered such as, for example, video media, audio media, audio/video media, video games, graphics, web pages, Internet data, etc. Additionally or alternatively, the content type information 410 may be used to indicate whether media content was live broadcast media or one or more downloaded clip(s) (e.g., delivered per-request, on-demand delivery, etc.).

To identify particular media programs, the example content session information data structure 400 includes media title information 412 and corresponding expected duration information 414 for the media of interest. In some instances, the expected duration information 414 may indicate a length of time that exceeds a difference between the measured start time information 402 and the measured end time information 404. Such instances may occur when the media content was interrupted by subscriber cancellation, subscriber selection of alternate media, subscriber request(s) to reload the media, and/or one or more interruptions due to incoming telephone calls and/or text messages.

The example data structure 400 also includes IP time offset information 416 to determine time offsets associated with delivery of IP packets. For example, the IP time offset information 416 may indicate the amount of time (e.g., due to carrier network latency, switch/router hops, media content provider delay, etc.) required for an IP network packet to propagate from a source (e.g., the media content provider 114 of FIG. 1) to a destination (e.g., the wireless communication devices 110 and 112 of FIG. 1). The IP time offset information 416 may be used by the carrier measurement entity 102 to generate media consumption and/or exposure information associated with QoS metrics. As described above, QoS metrics may also include, but are not limited to, signal strength information, channel power information, latency information, channel crowding, etc.

To determine a location of a wireless communication device (e.g., the wireless devices 110 and 112 of FIG. 1), when receiving media content, the example data structure 400 is provided with a transmitting tower/base station identifier (ID) 418. The transmitting tower/base station ID 418 may include one or more cellular tower identifiers and/or broadcast tower identifiers identifying one or more cellular towers and/or one or more broadcast towers from which the wireless communication devices 110 and 112 receive media content. The example carrier measurement entity 102, via the example wireless monitor interface 118, may use the transmitting tower/base station ID 418 to derive a location of cell towers that transmitted media content to the wireless communication devices 110 and 112 and/or derive an approximate location of the wireless communication device 110 and 112.

Additionally, the example data structure 400 includes location information 420 indicative of the location of the wireless communication devices 110 and 112 while receiving the media content. The location information 420 may be generated using location detection devices (e.g., global position system ("GPS") devices) in the wireless communication devices 110 and 112, using triangulation techniques involving detecting distances from one or more transceiver towers, and/or using any other location determination system.

To identify one or more carrier parameter values experienced by the subscriber while the media content was provided, the example data structure 400 includes any number of carrier parameters 422. Carrier parameters may include, but are not limited to a frame rate parameter 424 (e.g., a value in fps), a video resolution parameter 426, an audio quality parameter 428, a buffer time parameter 430, a base station power at the start time parameter 432, a base station power at the end time parameter 434, an average base station power during the entire media content delivery attempt 436 and/or any other metric indicative of signal strength. In the event that the subscriber causes one or more events during the time period in which the media content is delivered and/or attempted to be delivered, the example data structure 400 includes subscriber actions during delivery 438. As described above, subscriber actions may include a request to play the media content, pause the media content, fast forward, rewind, skip, reload/refresh the media content, and/or initiate alternate media content. One or more such events may be provided in the example data structure 400 as a comma delimited string.

While the example system 100 to identify wireless carrier performance effects has been illustrated in FIGS. 1 through 4, one or more of the interfaces, data structures, elements, processes, GUIs, and/or devices illustrated in FIGS. 1 through 4 may be combined, divided, re-arranged, omitted, eliminated and/or implemented in any other way. Further, the example carrier measurement entity 102, the example wireless communication devices 110 and 112, the example wireless monitor 116, the example wireless monitor interface 118, the example data acquisition engine 120, the example heuristics engine 122, the example scoring engine 124, the example data acquisition database 126, the example heuristics database 128, the example communication interface 302, the example memory 304, the example data packet analyzer 306, the example media decoder 308, the example location interface 312, the example application monitor 316, and/or the example content session information data structure 400 of FIGS. 1-4 may be implemented by hardware, software, firmware and/or any combination of hardware software and/or firmware. Thus, for example, any of the example carrier measurement entity 102, the example wireless communication devices 110 and 112, the example wireless monitor 116, the example wireless monitor interface 118, the example data acquisition engine 120, the example heuristics engine 122, the example scoring engine 124, the example data acquisition database 126, the example heuristics database 128, the example communication interface 302, the example memory 304, the example data packet analyzer 306, the example media decoder 308, the example location interface 312, the example application monitor 316, and/or the example content session information data structure 400 may be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example carrier measurement entity 102, the example wireless communication devices 110 and 112, the example wireless communicator 116, the example wireless communicator interface 118, the example data acquisition engine 120, the example heuristics engine 122, the example scoring engine 124, the example data acquisition database 126, the example heuristics database 128, the example communication interface 302, the example memory 304, the example data packet analyzer 306, the example media decoder 308, the example location interface 312, the example application monitor 316, and/or the example content session information data structure 400 are hereby expressly defined to include a tangible medium such as a memory, a digital versatile disc (DVD), a compact disc (CD), etc. storing the firmware and/or software. Further still, a communication system may include interfaces, data structures, elements, processes and/or devices instead of, or in addition to, those illustrated in FIGS. 1-4 and/or may include more than one of any or all of the illustrated interfaces, data structures, elements, processes and/or devices.

FIGS. 5, 6A, 6B, 7 and 8 illustrate example processes that may be performed to implement the example system 100 to identify wireless carrier performance effects of FIGS. 1-4. The example processes of FIGS. 5, 6A, 6B, 7 and 8 may be carried out by a processor, a controller and/or any other suitable processing device. For example, the example processes of FIGS. 5, 6A, 6B, 7 and 8 may be embodied in coded instructions stored on any tangible computer-readable medium such as a flash memory, a CD, a DVD, a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other tangible medium.

Alternatively, some or all of the example processes of FIGS. 5, 6A, 6B, 7 and 8 may be implemented using any combination(s) of ASIC(s), PLD(s), FPLD(s), discrete logic, hardware, firmware, etc. Also, one or more of the example operations of FIGS. 5, 6A, 6B, 7 and 8 may instead be implemented manually or as any combination of any of the foregoing techniques, for example, any combination of firmware, software, discrete logic and/or hardware. Further, many other methods of implementing the example operations of FIGS. 5, 6A, 6B, 7 and 8 may be employed. For example, the order of execution of the blocks may be changed, and/or one or more of the blocks described may be changed, eliminated, subdivided, or combined. Additionally, any or all of the example operations of FIGS. 5, 6A, 6B, 7 and 8 may be carried out sequentially and/or carried out in parallel by, for example, separate processing threads, processors, devices, discrete logic, circuits, etc.

Figure 5:
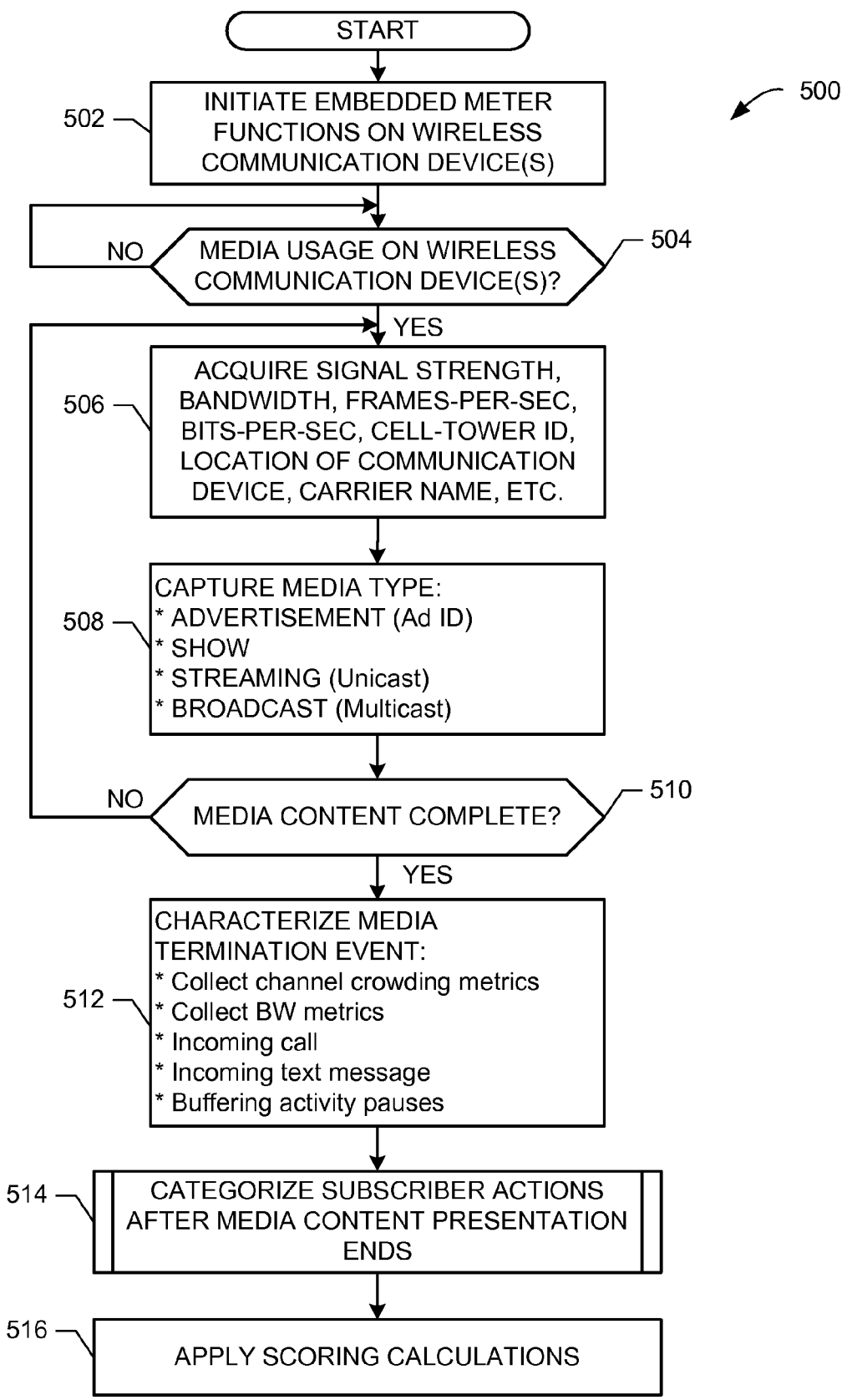
FIGS. 5, 6A, 6B and 7 are flowcharts representative of example processes that may be performed to implement one or more entities of the example systems and apparatus of FIGS. 1-4.

The example process 500 of FIG. 5 begins with the example wireless communicator 116 initiating embedded metering functions on a wireless communication device (block 502), such as on the example wireless communication devices 110 and 112 of FIG. 1. The example wireless monitor 116 may receive metering and/or other data acquisition software from the example carrier measurement entity 102 via a wireless software transfer. Alternatively, the metering software and/or data acquisition software executed by the example wireless monitor 116 may be pre-installed on the wireless communication devices 110 and 112 so that any associated subscriber is not burdened with one or more tasks related to installing and/or configuring metering software on the wireless communication devices 110 and 112. The metering software and/or hardware of the communication devices 110 and 112 may be configured to monitor all of the media content presented by the wireless carriers 106 and 108 and/or the metering software executed by the example wireless monitor 116 may be responsive to invocation requests of the example wireless monitor interface 118 to begin and/or cease monitoring tasks.

The example wireless monitor 116 monitors for an instance of media content being presented on the wireless communication device (block 504), such as a movie clip, an advertisement, audio, and/or web-browsing activity by the subscriber on the wireless communication device 110 and 112 shown in FIG. 1. In response to such media content presentation activity occurring (block 504), the example communication interface 302 of the wireless monitor 116 acquires one or more operating parameter values of the carrier (e.g., the carrier "A" 106, the carrier "B" 108), carrier network (e.g., router/switch information, router/switch performance information, etc.), the wireless media device 110 and 112 (e.g., battery strength, received signal power, channel, channel power, channel bandwidth, signal strength, etc.), and/or the media content provider 114 (block 506). Operating parameter values monitored, acquired and/or otherwise collected by the example wireless monitor 116 include, but are not limited to signal strength information, bandwidth information, frame-rate information (e.g., in fps), data rate information (e.g., in bps), audio quality information, tower/base-station identification information, location information, and/or carrier name information. Operating parameter values of the carrier and/or the carrier network may also be acquired by the example data acquisition engine 120. As described above, the example data acquisition engine 120 may be communicatively coupled to one or more test and measurement devices located at any number of points within a carrier network infrastructure. Communication to/from such test and measurement devices may be realized by way of IP network addressable commands to initiate network parameter metrics, such as channel power level measurements, signal strength measurements, network latency measurements and/or data rate measurements. Additionally, the example wireless monitor 116 captures the type of media content being displayed or attempted to be displayed on the wireless communication device 110 and 112 (block 508). Media content types may include, but are not limited to advertisements, television shows, unicast streaming, multicast broadcasts, and/or web-browsing activity.

Parameter performance data related to the carrier, the carrier network infrastructure and/or the wireless communication device may be stored by the wireless monitor 116 in the memory 304 and/or stored in the data acquisition database 126. The example communication interface 302 of the wireless monitor 116 monitors the wireless communication devices 110 and 112 for an instance of media content display completion, interruption, reloading, and/or cancellation (block 510). Details of such changes to the media content during the display and/or during the attempted display are logged by the example communication interface and saved to the memory 304 and/or the data acquisition database 126. Additionally, such actions may be saved in the example data structure 400 as one or more of the comma delimited subscriber actions 438 during delivery. In some instances, media content interruption is associated with a network explanation and/or error code. For example, if the media content was interrupted and/or otherwise did not begin or complete presentation on the wireless communication device, the carrier network error code(s) may provide information related to one or more causes. The example communication interface 302 monitors the carrier network for one or more error codes indicative of a reason that presentation of the media content stopped prematurely, such as channel crowding error codes, insufficient bandwidth error codes, incoming call/text error codes, and/or timeout error codes when buffering activity surpasses one or more predetermined threshold duration values (block 512). Without limitation, one or more error codes may originate from the wireless communication devices 110 and 112. For example, a low battery error code may be initiated by the communication device 110 that prevents one or more device functions (e.g., prevents playing MP3 file(s), prevents video display(s), prevents data access, etc.) in an effort to conserve remaining battery power.

Generally speaking, blocks 502 through 512 of the example process 500 of FIG.5 include data acquisition for each of any number of participating wireless communication devices, such as each of the wireless communication devices 110 and 112 that may operate in the example system 100 of FIG. 1. Collected data may be aggregated and processed at a later time and/or at periodic, aperiodic, scheduled, and/or on a manual basis to characterize the effects that wireless carrier performance has on one or more subscribers (block 514). In other words, the methods and apparatus described herein may identify carrier performance-based reasons why a subscriber may make one or more decisions when experiencing media content provided via the wireless carrier. Additionally or alternatively, the methods and apparatus described herein may utilize the collected data and apply one or more scoring calculations to determine, in part, which wireless carriers perform better or worse in view of industry standard expectations and/or performance thresholds (block 516).

Figure 6A:
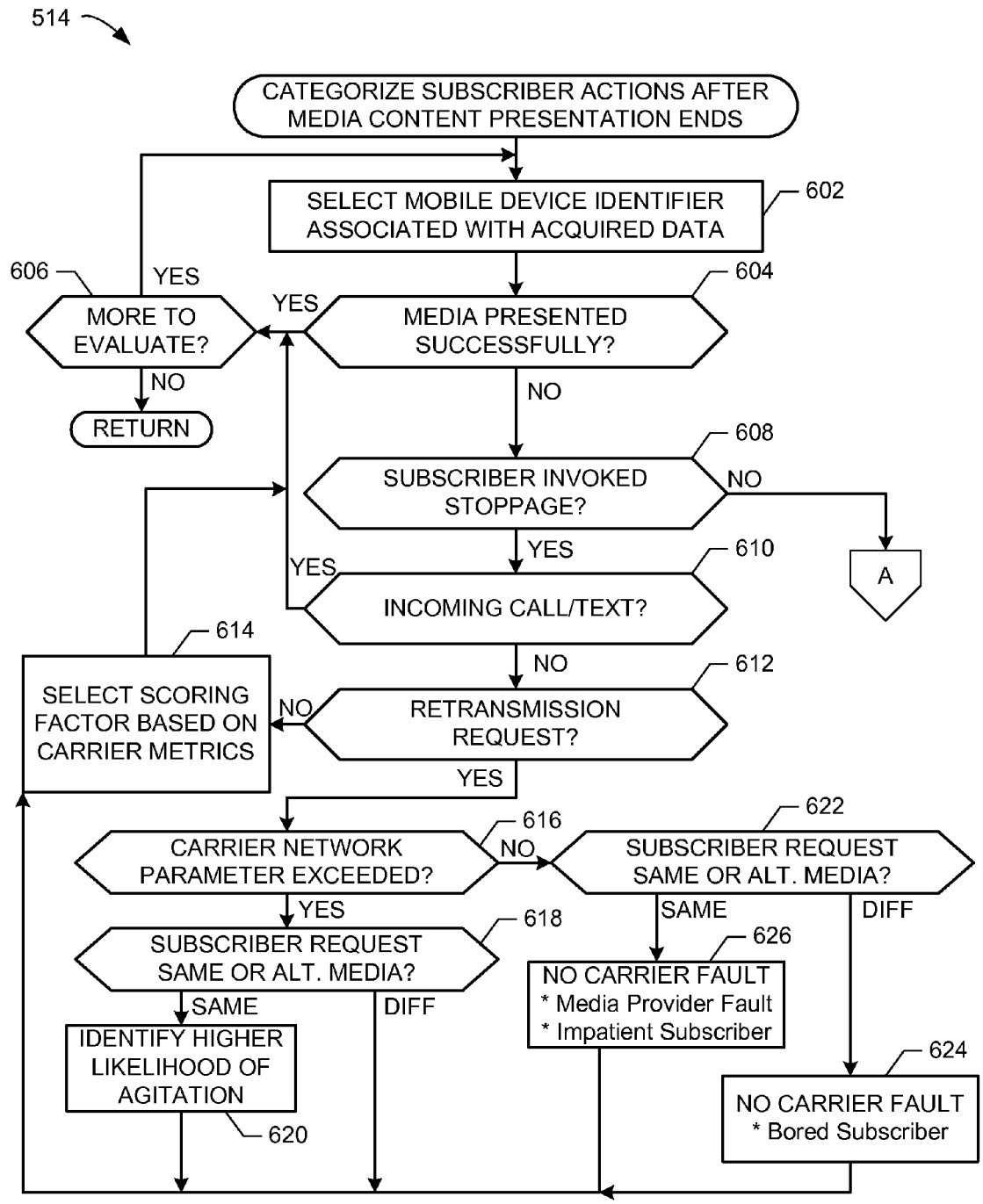

FIG. 6A illustrates an example process 514 that may be performed to categorize subscriber actions after/during the media content has completed a presentation operation and/or a presentation attempt on a wireless communication device 110 and 112. The example data acquisition engine 120 selects a mobile device identifier (e.g., a mobile telephone number, a mobile identification number, etc.) associated with any number of wireless communication devices of the example system 100 that may have received and/or attempted to receive media content from a wireless carrier (block 602). Each selected mobile device identifier includes at least one associated content session information data record 400 (FIG. 4) that details information relating to a subscriber experience with media content provided by a media content provider via a wireless carrier (e.g., the carrier "A" 106, the carrier "B" 108, etc.). The example data acquisition engine 120 identifies whether the broadcast media was presented without interruption and/or within predetermined quality parameter values (block 604). For example, the data acquisition database 126 may store one or more threshold values associated with performance parameters of a wireless carrier such as, but not limited to, bandwidth, data rate(s), latency, and/or load times (e.g., buffering delays). If the subscriber of the wireless communication device receives the complete media content and at a quality that meets or exceeds demands and/or expectations of the media content provider 114 (block 604), then control advances to block 606 and the example data acquisition engine 120 determines if there are more mobile device identifiers (e.g., subscribers with wireless communication devices) to analyze. If not, control returns to the process 500 of FIG. 5, as discussed in further detail below, otherwise control returns to block 602.

However, if the media content is not presented successfully (block 604), such as one or more instances when the subscriber only receives a portion of the media content, or the subscriber skips further retrieval attempts for the media content, and/or the carrier network drops further transmission attempts of the media content due to network infrastructure limitations (e.g., channel crowding, excessive use/burden, time of day bandwidth stress, etc.), then the example heuristics engine 122 determines whether the media content interruption was caused by subscriber action or carrier network action (block 608). The example heuristics engine 122 reviews one or more entries to the example content session information data record 400 of FIG. 4 to determine whether the media content interruption was caused by an incoming telephone call and/or incoming text message (block 610). Such interruptions are not typically considered to represent wireless carrier fault and/or blame, thus control returns to block 606, otherwise the example heuristics engine 122 determines whether the subscriber invoked one or more retransmission requests of the media content (block 612). If not, then the interruption of the media content did not arise by way of subscriber request and/or command, but rather by way of wireless carrier fault and/or one or more faults related to the media content provider and/or intranet/Internet congestion. To further identify where to assert fault, if anywhere, the example heuristics engine 122 parses the example heuristics matrix 200 (FIG. 2) for a matching condition based on one or more wireless carrier performance parameters (block 614). Conditions may be identified by the heuristics engine 122 as a heuristic set, which includes a combination of a media action 202 with a corresponding carrier parameter 204 to yield a corresponding scoring factor 206. For example, if the subscriber did not cause the media content to stop by way of express command (e.g., a stop command, a skip command, etc.), then the corresponding media action column 202 scenario is identified by the heuristics engine 122, in which the media is interrupted and/or otherwise stops presentation without an associated subscriber cancel request (row 250, FIG. 2). Additionally, in an effort to associate a corresponding scoring factor 206 with the media action 202, the example data acquisition engine 120 determines whether one or more wireless carrier performance parameters are outside one or more acceptable limits by comparing one or more thresholds stored in the data acquisition database 126 to parameter values stored in the example content session information data record 400 (FIG. 4). In the event that, for example, the wireless carrier had a parameter value (e.g., a latency value) that exceeded a corresponding threshold value by no more than 5% (see 252 of FIG. 2), then the heuristics engine 122 associates the wireless carrier's media content event with a negative scoring factor of –0.15 (see 254 of FIG. 2) (block 614). Control returns to block 606 to determine if there are additional mobile identification numbers to evaluate.

Returning to block 612, in the event that the subscriber is the cause of the media content stoppage due to, for example, a retransmission request, then the example heuristics engine 122 identifies a corresponding media action 202 (see row 208 of FIG. 2), and the example data acquisition engine parses the example content session information data record 400 (FIG. 4) for evidence that a wireless carrier parameter was exceeded at the time (block 616). If so, then the example heuristics engine 122 may further evaluate what the subscriber did to a greater degree of precision in an effort to ascertain a relative level of subscriber frustration (block 618). More specifically, the example heuristics engine 122 identifies whether the subscriber, when interrupting and/or causing the media content to stop, requested a retransmission of the same media content (e.g., a first media content sample) or alternate media content (e.g., a second media content sample) (block 618). In the event that the subscriber made one or more requests to retrieve and/or otherwise obtain the same media content again, a higher likelihood of subscriber frustration and/or agitation exists (block 620). Such a situation directs the heuristics engine 122 to identify a corresponding scoring factor with the media action 202 category associated with row 214 of FIG. 2. Briefly, the scoring factors 206 associated with media action 202 category of row 208, which is a subscriber-caused transmission cessation event are lower than those scoring factors 206 associated with media action 202 category of row 214, which illustrates a subscriber's demonstrated determination to obtain the same media content. Control advances to block 614 to match the identified combination of the media action 202 and the carrier metric 204 with a corresponding scoring factor 206.

In the event that the subscriber makes a retransmission request (block 612), but there were no associated wireless carrier parameter values exceeded (block 616), the example heuristics engine 122 identifies whether the subscriber's retransmission request was for the same media content or alternate media content (block 622). In either situation, the wireless carrier has no fault because the carrier parameter values were at (or better than) one or more parameter value thresholds of an expected QoS (e.g., one or more QoS parameter thresholds agreed upon via contractual agreement between the media content provider and the wireless carrier). At least two potential circumstances may explain why a subscriber made one or more retransmission requests despite the fact that the wireless carrier parameter thresholds met expectations. For example, a subscriber may have been bored with the media content and/or disinterested in the media content (block 624). Such a circumstance may allow the media content provider to consider whether the media content achieves one or more expected objectives at captivating a target audience and/or entertaining the target audience. For instance, the media content provider may log a number of instances in which a subscriber selects, skips and/or navigates via their wireless device for alternate media content when there are no issues with the wireless carrier's ability to maintain expected parameter values (e.g., expected data rates, expected video resolution, expected buffering delays, etc.).

Another reason that the subscriber made one or more retransmission requests despite the fact that the wireless carrier parameter thresholds met expectations may be that network congestion occurs at one or more network locations that precede the wireless carrier's network infrastructure. In other words, any failure to provide the subscriber with requested media content may be attributed to the media content provider and/or Internet congestion outside the control of the wireless carrier (block 626). Control advances to block 614 to match the identified combination of the media action 202 and the carrier metric 204 with a corresponding scoring factor 206. In some instances, the corresponding scoring factor may credit the wireless carrier when one or more operating parameters exceed agreed upon thresholds, thereby indicating a better ability to satisfy subscriber needs and/or expectations for data, voice and/or video services.

Figure 6B:
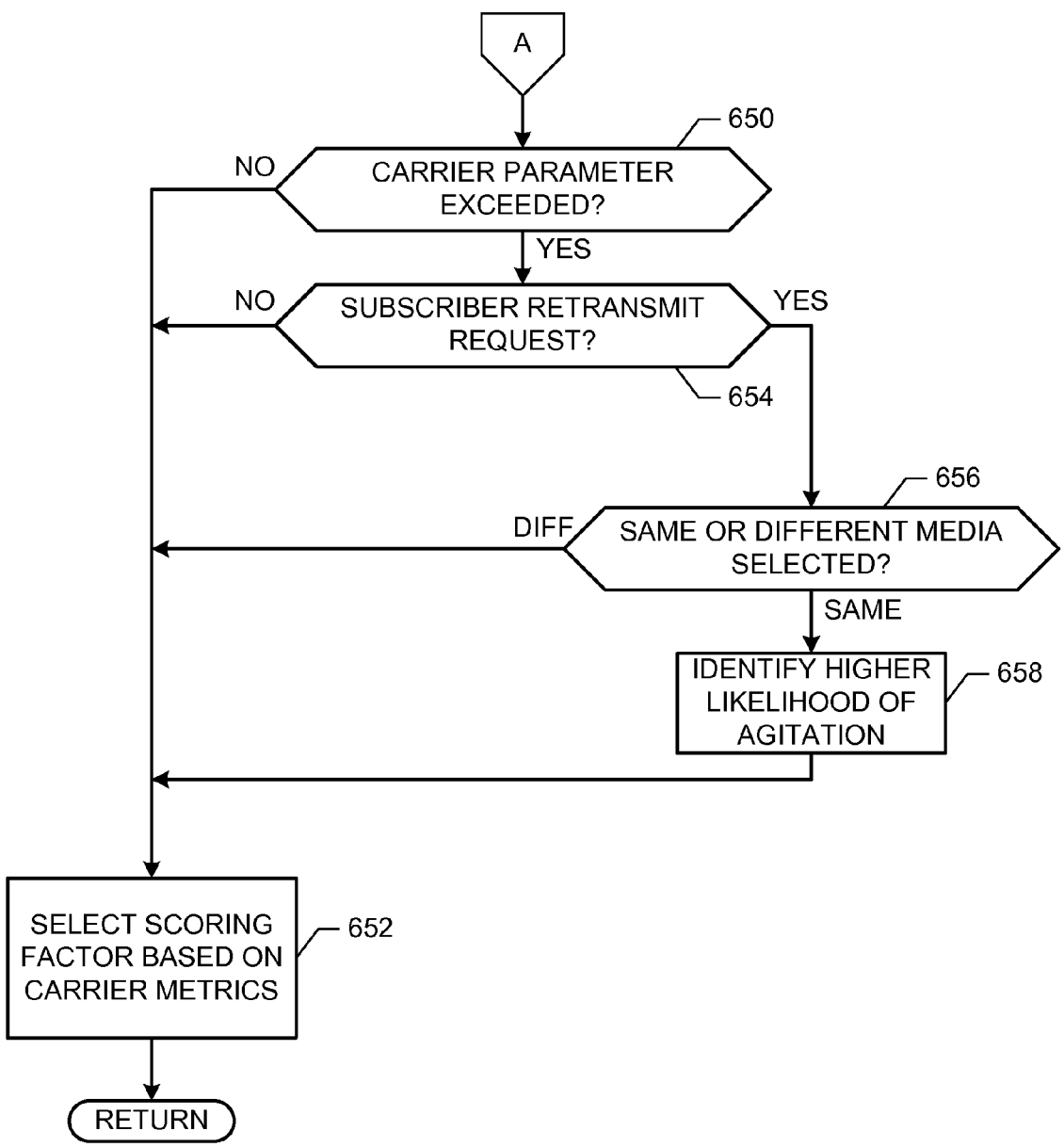

Returning to block 608, if the subscriber does not interrupt and/or cause the media content to stop, the example data acquisition engine 120 identifies whether one or more operating parameters of the wireless carrier has been exceeded (block 650), as shown in FIG. 6B. If not, then the example heuristics engine 122 selects a scoring factor based on the fact that the wireless carrier did not cause the interrupted and/or stopped media content (block 652). Instead, such display of media content may be attributed to general Internet congestion and/or one or more intranet and/or infrastructure limitations on behalf of the media content provider. In some instances, the example heuristics engine 122 may select a scoring factor having a positive value to represent meeting or exceeding a media presentation quality requirement operating parameter(s) if such operating parameter(s) meet and/or exceed one or more established thresholds. However, in the event that the wireless carrier has been identified as exceeding one or more operating parameters (block 650), the example heuristics engine 122 determines whether the subscriber has made one or more retransmission requests (block 654). Generally speaking, a subscriber that does not invoke one or more retransmission requests is deemed by the example heuristics engine 122 as having a relatively mild degree of frustration with their wireless communication device and/or wireless service provider, and an associated scoring factor is identified (block 652). For those subscribers that do make one or more retransmission requests (block 654), the example heuristics engine 122 further identifies whether such retransmission requests were for the same or alternate media content (block 656). Subscribers that select alternate media in response to a failed prior attempt (block 656) may also experience a relatively moderate degree of frustration, which is reflected in a corresponding applied scoring factor 206 by the example heuristics engine 122. On the other hand, subscribers that select the same media for retransmission in response to a failed prior attempt (block 656) exhibit a greater determination to retrieve the media content, thereby indicating a greater degree of frustration (block 658). The example heuristics engine 122 takes such elevated likelihood of subscriber agitation into consideration when identifying a corresponding scoring factor 206 from the example heuristics matrix 200 of FIG. 2.

Figure 7:
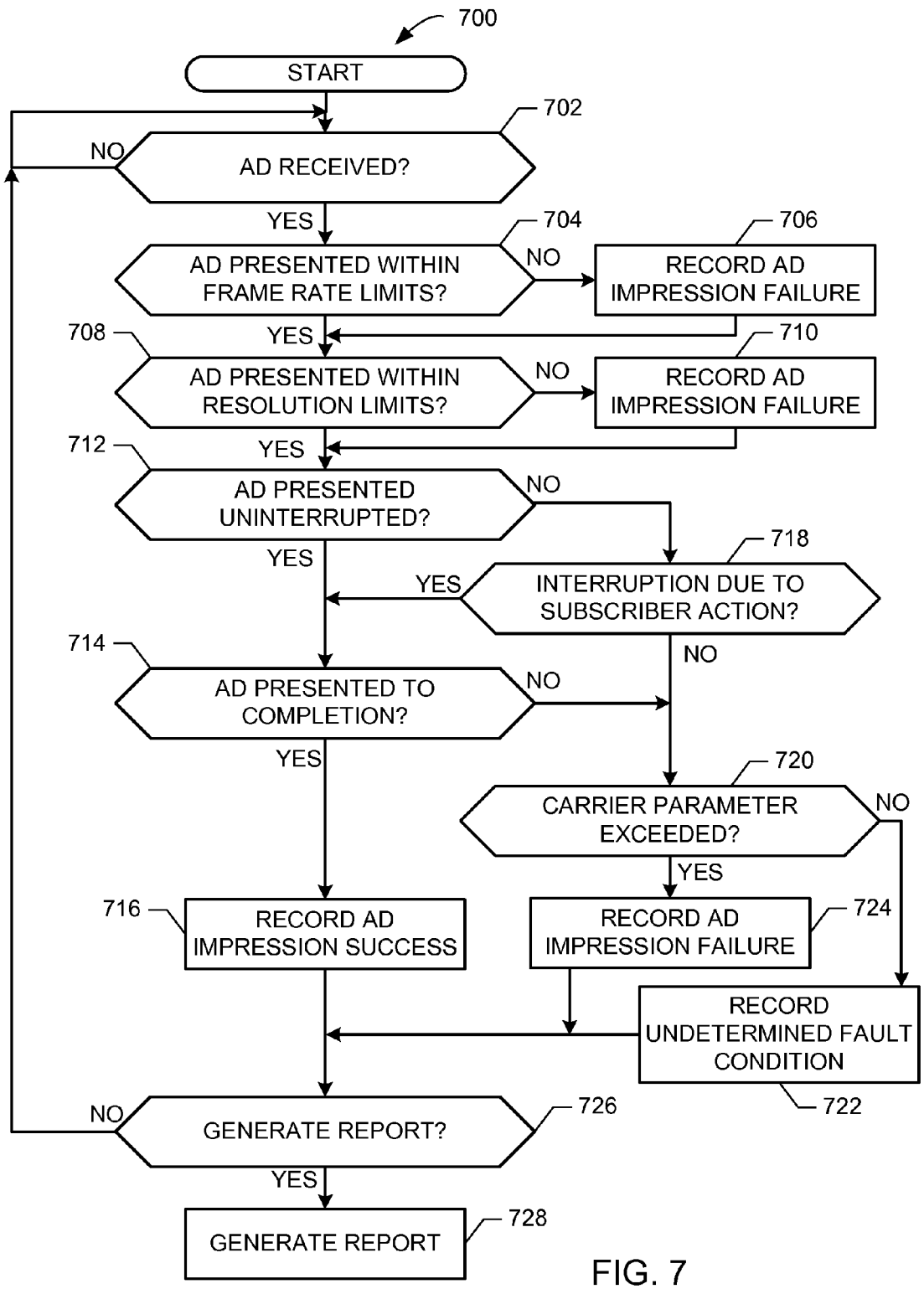

FIG. 7 illustrates an example process 700 to identify a wireless carrier advertisement presentation success value. At least one objective addressed by the example process 700 of FIG. 7 is to allow the media content provider to identify objective metrics related to success and/or failure of a wireless carrier to display advertising content to wireless subscribers. In turn, media content providers may have additional negotiating leverage to establish a market value price for the display services offered by the wireless carriers. In other words, successful occurrences of advertisement display typically warrant a higher per-advertisement fee paid by the media content provider, while failed occurrences of advertisement display may allow the media content provider to justify payment withholding.

The example process 700 begins with the example communication interface 302 waiting for an occurrence of advertisement reception (block 702). When an advertisement is detected by the example communication interface 302, the example wireless monitor 116 (via the example communication interface 302, the example data packet analyzer, and/or the example application monitor 316) detects whether the advertisement is presented to the subscriber within one or more a frame-rate limits (block 704) (e.g., threshold limit value(s)). If not, the example wireless monitor 116 logs/records an instance of advertisement impression failure (block 706), but continues to monitor the advertisement display for one or more additional carrier performance parameters of interest. The example wireless monitor 116 detects whether the advertisement is presented to the subscriber within a resolution limit (block 708) and records an instance of advertisement impression failure (block 710) in the event that the wireless carrier displays the advertisement outside such threshold limits. In the event that the advertisement is presented without interruption (block 712), such as without buffering delays, the example wireless communicator 116 also determines whether the advertisement is fully displayed to completion (block 714). If so, an instance of advertising impression success is logged/recorded/saved by the example wireless monitor 116 (block 716).

However, if the advertisement is interrupted during the display attempt (block 712), the example wireless monitor 116 determines whether such an interruption was due to subscriber action (block 718), such as a pause, skip and/or subscriber cancel request. If so, then the example wireless monitor 116 does not apply fault by way of recording an impression failure, but rather allows the example process 700 to advance to block 714. In the event that the subscriber did not cause the advertisement interruption during the presentation attempt (block 718), then the interruption fault (e.g., excessive buffering delay(s)) may be due to the wireless carrier, Internet congestion, and/or the media content provider. To resolve whether the wireless carrier is at fault, the example wireless monitor 116 and/or the data acquisition engine 120 determine whether the wireless carrier has exceeded any operating parameters (block 720). If not, then fault is undetermined (block 722), otherwise an instance of advertisement impression failure is recorded (block 724).

The example wireless monitor 116 returns to block 702 to wait for one or more additional instances of an advertisement presentation on the wireless communication device(s) 110 and 112 (block 726) unless a request to generate a report is invoked. Report requests may be invoked to generate an aggregated list of advertisement impressions on a periodic, aperiodic, scheduled and/or manual basis (block 728).

Figure 8:
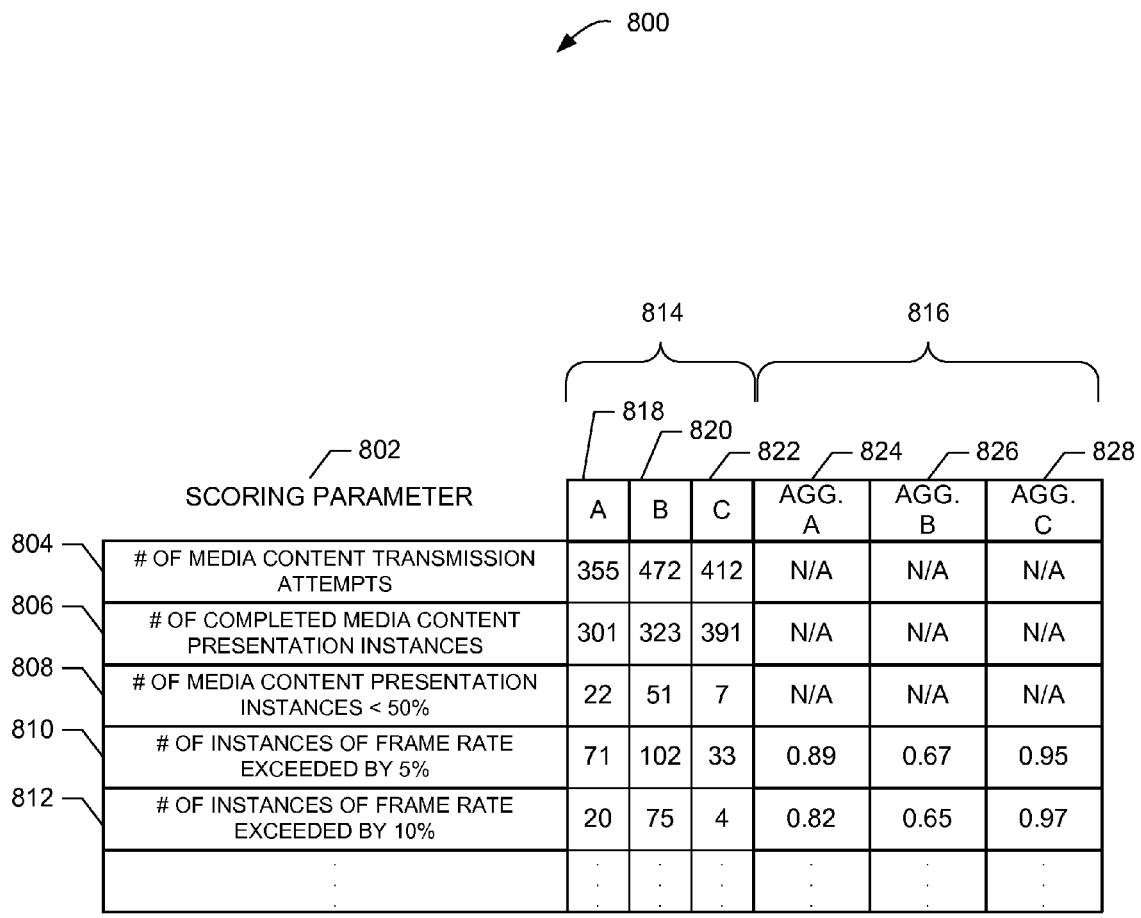
FIG. 8 is an example report generated by the example system of FIG. 1.

FIG. 8 illustrates an example report 800 generated in response to one or more iterations of the example process 700 of FIG. 7 and/or one or more iterations of the example process 500 and/or 600 of FIGS. 5, 6A, and/or 6B. In the illustrated example of FIG. 8, the report 800 includes a column of scoring parameters of interest 802 that may be monitored and/or measured by the example wireless monitor 116 and/or the example carrier measurement entity 102. Example scoring parameters of interest 802 shown in the illustrated report 800 of FIG. 8 include a number of media content (e.g., an advertisement, a movie, a television show, a radio broadcast, a web-page navigation, etc.) transmission attempts 804, a number of completed media content presentation instances 806, a number of media content display instances of less than 50% 808 (e.g., a one-minute advertisement only displayed on the wireless communication device 110 and 112 for thirty seconds or less), a number of instances of the frame rate parameter exceeded by 5% 810, a number of instances of the frame rate parameter exceeded by 10% 812, etc. Any number of additional scoring parameters may be included in the example report 800.

Each scoring parameter of interest 802 includes a corresponding count value 814 and a corresponding aggregate score value 816. As described above, the count values 814, such as a count value for carrier "A" 818, a count value for carrier "B" 820, and a count value for carrier "C" 822 may be derived from the example process 700 of FIG. 7. Also described above, the aggregate score values 816, such as an aggregate parameter score for the carrier "A" 824, an aggregate parameter score for the carrier "B" 826, and an aggregate score for carrier "C" 828 may be derived from the example process 600 of FIGS. 6A, 6B and the matching scoring factors 206 identified from one or more matching media action(s) 202 and carrier metrics 204 of FIG. 2. As shown in the example report 800 of FIG. 8, some scoring parameters are not associated with an aggregate score value ("n/a"), but are instead metrics related to a raw count value. Each example report 800 may be generated by the example carrier measurement entity 102 on a periodic basis, aperiodic basis, scheduled basis, and/or manual basis. In an effort to identify one or more trends of each carrier of interest, prior generated reports may be saved with a time/date indicator.

In the illustrated example of FIG. 8, the report 800 aggregate score value 816 provides a normalized value for a given time period for each carrier of interest 824, 826, and/or 828 and a corresponding scoring parameter 802. Each normalized aggregate score value is calculated based on any number of media content display instances on wireless communication devices for each respective wireless carrier and adjusted/normalized to fit within boundary values between zero and one. For instance, higher normalized scoring values shown in the illustrated example report 800 of FIG. 8 may be indicative of a carrier having a better relative ability to meet parameter limits and/or values (e.g., that wireless carrier received fewer negative scoring factor values 206 during a given time period of interest than other wireless carriers). Additionally, because each scoring factor 206 identified during the example process 600 of FIGS. 6A and 6B is based on, in part, subscriber action(s) in response to a given set of wireless parameters present during a media content display instance, such resulting aggregate score values 816 are indicative of a degree of subscriber frustration.

Figure 9:
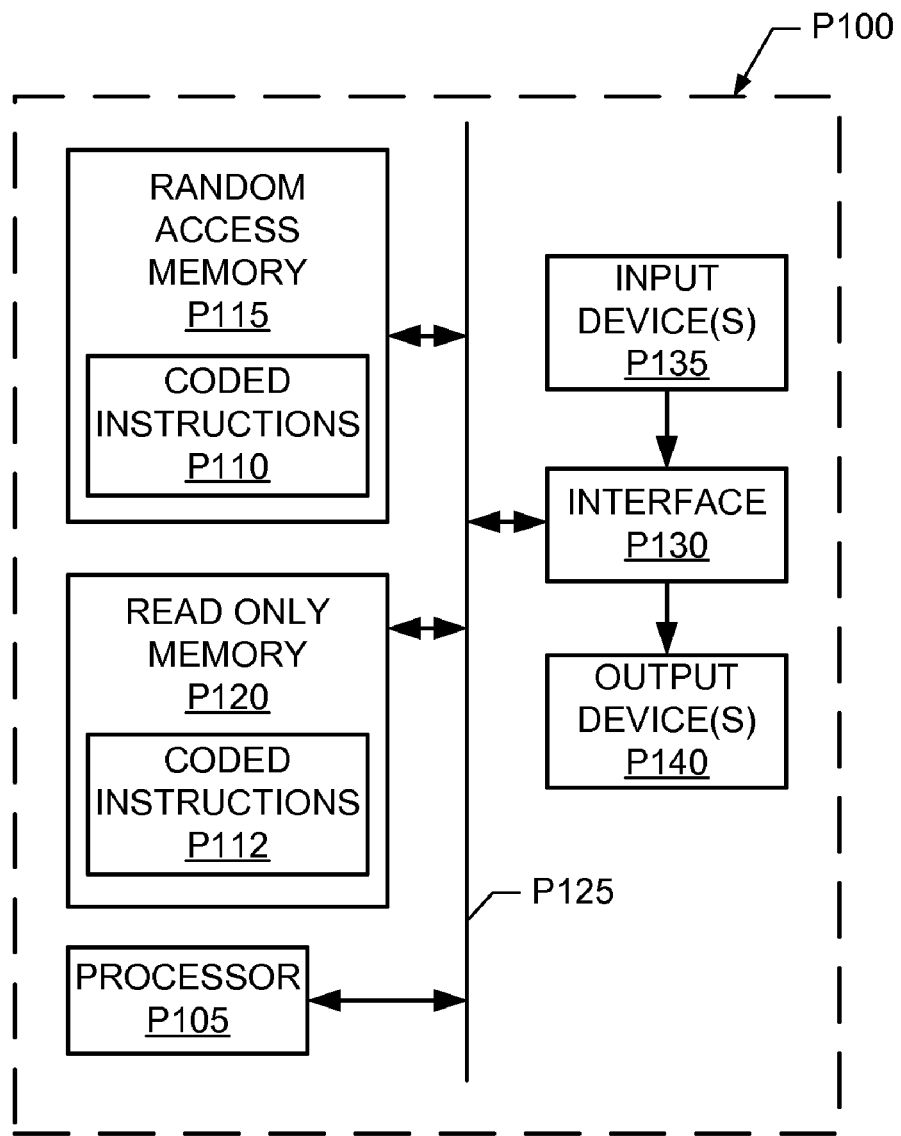
FIG. 9 is a block diagram of an example processor system that may be used to execute the example processes of FIGS. 5, 6A, 6B and 7 to implement the example systems, apparatus, and/or methods described herein.

FIG. 9 is a schematic diagram of an example processor platform P100 that may be used and/or programmed to implement any or all of the example carrier measurement entity 102, the example wireless communicator interface 118, the example data acquisition engine 120, the example heuristics engine 122, the example scoring engine 124, the example wireless communicator 116, the example communication interface 302, the example memory 304, the example data packet analyzer 306, the example media decoder(s) 308, the example location interface 312 and/or the example application monitor 316 of FIGS. 1 and 2. For example, the processor platform P100 can be implemented by one or more general-purpose processors, processor cores, microcontrollers, etc.

The processor platform P100 of the example of FIG. 9 includes at least one general-purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example processes of FIGS. 5, 6A, 6B and 7 to implement the example methods and apparatus described herein.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. Access to the memory P115 and the memory P120 may be controlled by a memory controller (not shown). The example memory P115 may be used to implement the example heuristics database 128, the example data acquisition database 126 and/or the example memory 302 of FIGS. 1 and 2.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A computer implemented method to score a wireless carrier, comprising:
   receiving an indication of media content presentation on a wireless communication device;
   monitoring a wireless carrier operating parameter in response to receiving the indication of media content presentation;
   monitoring the wireless communication device for a media content presentation command;
   associating the media content presentation command and the wireless carrier operating parameter with a scoring factor indicative of subscriber preferences; and
   assigning a first value to the scoring factor when the media content presentation command is a subscriber generated cancel request.

2. A method as defined in claim 1, wherein receiving the indication of media content presentation further comprises a first request command for a first media content initiated by the wireless communication device.

3. A method as defined in claim 2, wherein the media content presentation command occurs after the first request command, the media content presentation command comprising a retransmit request.

4. A method as defined in claim 3, wherein the retransmit request comprises a request for retransmission of the first media content.

5. A method as defined in claim 4, wherein the scoring factor is based on the retransmission request of the first media content.

6. A method as defined in claim 3, wherein the retransmit request comprises a request for transmission of a second media content, the second media content unrelated to the first media content.

7. A method as defined in claim 6, wherein the scoring factor is based on the retransmission request of the second media content.

8. A method as defined in claim 1, further comprising assigning a second value to the scoring factor when the media content presentation command is a subscriber generated retransmission request.

9. A method as defined in claim 8, further comprising assigning a third value to the scoring factor when the subscriber generated cancel request is associated with a wireless carrier operating parameter not meeting a quality requirement.

10. A method as defined in claim 8, further comprising assigning a fourth value to the scoring factor when the subscriber generated retransmission request is associated with a wireless carrier operating parameter not meeting a quality requirement.

11. A tangible machine readable storage medium comprising instructions that, when executed, cause a machine to, at least:
    receive an indication of media content presentation on a wireless communication device;
    monitor a wireless carrier operating parameter in response to receiving the indication of media content presentation;
    monitor the wireless communication device for a media content presentation command;
    associate the media content presentation command and the wireless carrier operating parameter with a scoring factor indicative of subscriber preferences; and
    assign a first value to the scoring factor when the media content presentation command is a subscriber generated cancel request.

12. A machine readable storage medium as defined in claim 11, wherein the instructions, when executed, cause the machine to receive a first request command for a first media content initiated by the wireless communication device.

13. A machine readable storage medium as defined in claim 11, wherein the instructions, when executed, cause the machine to assign a second value to the scoring factor when the media content presentation command is a subscriber generated retransmission request.

14. A machine readable storage medium as defined in claim 13, wherein the instructions, when executed, cause the machine to assign a third value to the scoring factor when the subscriber generated cancel request is associated with a wireless carrier operating parameter not meeting a quality requirement.

15. A machine readable storage medium as defined in claim 13, wherein the instructions, when executed, cause the machine to assign a fourth value to the scoring factor when the subscriber generated retransmission request is associated with a wireless carrier operating parameter not meeting a quality requirement.

* * * * *